(12) United States Patent
Holland

(10) Patent No.: US 12,033,150 B2
(45) Date of Patent: Jul. 9, 2024

(54) SYSTEMS AND PROCESSES FOR GENERATING A SINGLE CRYPTOCURRENCY ADDRESS MAPPING SPACE FOR A PLURALITY OF CRYPTOCURRENCIES BY CLUSTERING

(71) Applicant: CipherTrace, Inc., Menlo Park, CA (US)

(72) Inventor: Shannon Holland, San Francisco, CA (US)

(73) Assignee: CipherTrace, Inc., Menlo Park, CA (US)

(*) Notice: Subject to any disclaimer, the term of this patent is extended or adjusted under 35 U.S.C. 154(b) by 289 days.

(21) Appl. No.: 17/694,265

(22) Filed: Mar. 14, 2022

(65) Prior Publication Data
US 2023/0289795 A1    Sep. 14, 2023

(51) Int. Cl.
*G06Q 20/38* (2012.01)
*G06Q 20/40* (2012.01)
(Continued)

(52) U.S. Cl.
CPC ....... *G06Q 20/401* (2013.01); *G06Q 20/3825* (2013.01); *G06Q 20/3829* (2013.01);
(Continued)

(58) Field of Classification Search
CPC .............. G06Q 20/401; G06Q 20/3825; H04L 9/3073; H04L 9/0825
See application file for complete search history.

(56) References Cited

U.S. PATENT DOCUMENTS 10,915,895 B1 *  2/2021  Fogg ................. G06Q 20/0655
11,038,685 B1 *  6/2021  Dennis .................. H04L 9/3239
(Continued)

OTHER PUBLICATIONS

Alex Biryukov Deanonymization and linkability of cryptocurrency Deanonymization and linkability of cryptocurrency transactions based on network analysis ; IEEE:2019. pp. 172-184.*
(Continued)

*Primary Examiner* — Monjur Rahim
(74) *Attorney, Agent, or Firm* — Barta Jones, PLLC

(57) ABSTRACT

Systems and processes for generating a single cryptocurrency address mapping space for a plurality of cryptocurrencies including a global map of activity for the plurality of cryptocurrencies by clustering different addresses used in separate cryptocurrency transactions that are controlled by a same individual or entity are disclosed. Some embodiments may include: clustering the signed first cryptocurrency transaction and the signed second cryptocurrency transaction based on the determining the signed first cryptocurrency transaction and the signed second cryptocurrency transaction being controlled by the same individual or entity and displaying an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction being controlled by the same individual or entity.

20 Claims, 12 Drawing Sheets

(51) Int. Cl.
   *H04L 9/06* (2006.01)
   *H04L 9/08* (2006.01)
   *H04L 9/30* (2006.01)
   *H04L 9/32* (2006.01)
   *H04L 9/00* (2022.01)

(52) U.S. Cl.
   CPC .......... *H04L 9/0825* (2013.01); *H04L 9/3073* (2013.01); *H04L 9/3239* (2013.01); *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 11,861,587 | B1* | 1/2024 | Arroyo, Jr. | G06Q 20/3278 |
| 2015/0287026 | A1* | 10/2015 | Yang | G06Q 20/065 |
| | | | | 705/69 |
| 2015/0363769 | A1* | 12/2015 | Ronca | G06Q 20/381 |
| | | | | 705/64 |
| 2015/0363770 | A1* | 12/2015 | Ronca | G06Q 20/382 |
| | | | | 705/64 |
| 2015/0363772 | A1* | 12/2015 | Ronca | G06Q 20/3829 |
| | | | | 705/71 |
| 2015/0363876 | A1* | 12/2015 | Ronca | G06Q 40/04 |
| | | | | 705/37 |
| 2018/0264347 | A1* | 9/2018 | Tran | A63B 69/38 |
| 2020/0117690 | A1* | 4/2020 | Tran | G06F 16/90332 |
| 2020/0394651 | A1* | 12/2020 | Kreder, III | G06Q 20/02 |
| 2021/0158339 | A1* | 5/2021 | Tollo | G06Q 20/401 |
| 2021/0398211 | A1* | 12/2021 | Maathur | G06Q 20/401 |
| 2022/0188812 | A1* | 6/2022 | Petersen | G06Q 20/3823 |
| 2022/0209962 | A1* | 6/2022 | Tarnow | H04L 9/3252 |
| 2023/0052909 | A1* | 2/2023 | Sforzin | G06Q 20/38215 |
| 2023/0289795 | A1* | 9/2023 | Holland | G06Q 20/401 |
| 2023/0412400 | A1* | 12/2023 | Fürstner | H04L 63/0853 |

OTHER PUBLICATIONS

Apidiali-Muller, Sofia, "International Search Report & Written Opinion", International Application No. PCT/US2023/012394, dated May 10, 2023, 15 pages.

Framewala Aman, et al., "Blockchain Analysis Tool For Monitoring Coin Flow", 2020 Seventh International Conference on Software Defined Systems (SDS), IEEE, Apr. 20, 2020, pp. 196-201.

Zhang Zongyang, et al., "CLTracer: A Cross-Ledger Tracing framework based on address relationships", Computers & Security, Elsevier Science Publishers. Amsterdam, NL, vol. 113, Nov. 22, 2021, 15 pages.

Haaroon Yousaf, et al., "Tracing Transactions Across Cryptocurrency Ledgers", USENIX, USENIX , The Advanced Computing Systems Association, Feb. 3, 2021, retrieved Apr. 26, 2023, http://www.usen1x.org/system/fies/sec19-yousaf_0.pdf, 15 pages.

* cited by examiner

| CLUSTER ID | OWNER | TYPE | COUNTRY | ADDRESSES | |
|---|---|---|---|---|---|
| 0862afc6 | CHANGELLY.COM | HIGH RISK EXCHANGE | HONG KONG | COUNT 227,324 | Viewing page: 1 of 2274 |

| ASSET | RISK | ADDRESS | BALANCE | TX RECEIVED | RECEIVED |
|---|---|---|---|---|---|
| BTC | 1 | 1G6CUt9ntVZufcCsVdc8q... | 0.00000000 | 7 | 0.00081784 |
| BTC | 1 | 1CYGakPeazBBkePjo9Enip... | 0.00000000 | 1 | 2.74400857 |
| BTC | 1 | 1ECkxTxDE7n9ygoaKowiR... | 0.00000000 | 1 | 0.04484390 |
| BTC | 1 | 12hWd7fnbUzFb5TZ2rqzM... | 0.00000000 | 1 | 1.99519024 |
| BTC | 1 | 16LN68W8qeE79rbalUGSw... | 0.00000000 | 1 | 1.00000000 |
| BTC | 1 | 1Aihbpn2pGXLkXL22CNTS... | 0.00000000 | 1 | 0.00255388 |
| BTC | 1 | 15p75bBS6KAchCJ1KXdisk... | 0.00000000 | 1 | 0.01643753 |
| BTC | 1 | 1CTC16KqviZM85kP7F5sT... | 0.00000000 | 1 | 0.01155529 |
| BTC | 1 | 1KeDQFWS1zaKUnk1HaCT... | 0.00000000 | 1 | 0.71373005 |
| BTC | 1 | 19sityZZULaiR5PW6zoGth... | 0.00000000 | 1 | 3.73778419 |
| BTC | 1 | 19Nb2o3WMF13rasbBFgw... | 0.00000000 | 1 | 0.02050000 |
| BTC | 4 | 1KdPjFkziNPsjz3ya4dWUb... | 0.00000000 | 3 | 1.76412611 |
| BTC | 1 | 1CcBb6yEaqSxrNdoLDYr5... | 0.00000000 | 1 | 8.79250000 |
| BTC | 1 | 13B4VNipryvDbCpNapryM... | 0.00000000 | 1 | 0.06535646 |
| BTC | 4 | 1ApMLD5BtEBEvdUvenh6e... | 0.00000000 | 1 | 0.00109471 |

FIG. 4

| CLUSTER ID 530 | OWNER 535 | TYPE | COUNTRY 540 | ADDRESSES 545 | |
|---|---|---|---|---|---|
| 0048f8fc 505 | POLONIEX.COM 510 | EXCHANGE | SEYCHELLES 515 | COUNT 288,244 520 | Viewing page: 1 of 2 525 |

| ASSET | RISK | ADDRESS | BALANCE | TX RECEIVED | RECEIVED |
|---|---|---|---|---|---|
| LTC | 2 | LcLSzyFW48NgKrEQ5KNk... | 0.00000000 | 5 | 8.43900000 |
| LTC | 2 | LUehkbuNpv2pe1QmEbr6K... | 0.00000000 | 1 | 0.01831820 |
| LTC | 2 | LPgf9kjv9H1Vuh4XSaKhzB... | 0.00000000 | 15 | 4.46971590 |
| LTC | 2 | LKf3psDQoiSdAAJmrJzXn... | 0.00000000 | 23 | 605.00475863 |
| LTC | 2 | LMPnXoo98SHzQErFB9U... | 0.00000000 | 1 | 0.14957914 |
| LTC | 2 | LhvWpPGjL7Cs3xR16niVXf... | 0.00000000 | 4 | 25.73253824 |
| LTC | 2 | LZ6YUAc4My87ARGbFM9... | 0.00000000 | 6 | 89.72315622 |
| LTC | 2 | LMnfkf2D2ANLVnMRaisxZ.... | 0.00000000 | 1 | 0.09100000 |
| LTC | 2 | LXUNBPsRRzFAMZW2N2r... | 0.00000000 | 1 | 0.01691635 |
| LTC | 2 | LUXEppKTirBK8EdGktGYC... | 0.00000000 | 1 | 0.03520654 |
| LTC | 2 | LUsAF3JQkhnB7Wx7kRPv... | 0.00000000 | 3 | 109.99000000 |
| LTC | 2 | LbgZNP1MtnzNJJiEScVbo... | 0.00000000 | 2 | 5.27548780 |
| LTC | 2 | LhBVtsxW3rZ9Hvdj2mpzS... | 0.00000000 | 10 | 163.02004716 |
| LTC | 2 | Lcbo1WV4q5PguXwADfon... | 0.00000000 | 1 | 0.01500328 |
| LTC | 2 | LYTGnq1MLCdgywq7QKfah... | 0.00000000 | 1 | 0.01653117 |
| LTC | 2 | LPKfZ5Mdsq6onveWvy2bn... | 0.00000000 | 1 | 0.21539077 |
| LTC | 2 | LhFuZ3dsriq2xSuFN8mEM... | 0.00000000 | 1 | 8.62272165 |

FIG. 5

SYSTEMS AND PROCESSES FOR GENERATING A SINGLE CRYPTOCURRENCY ADDRESS MAPPING SPACE FOR A PLURALITY OF CRYPTOCURRENCIES BY CLUSTERING

FIELD OF THE DISCLOSURE

The present disclosure relates to systems and processes for generating a single cryptocurrency address mapping space for a plurality of cryptocurrencies including a global map of activity for the plurality of cryptocurrencies by clustering different addresses used in separate cryptocurrency transactions that are controlled by a same individual or entity.

SUMMARY

In some aspects, the techniques described herein relate to a system, including: one or more hardware processors configured by machine-readable instructions to: receive first blockchain data for a first cryptocurrency chain from a first cryptocurrency chain participant node, the first blockchain data including a first cryptocurrency chain transaction block data including a signed first cryptocurrency transaction including a first human readable address hash and a first address key pair, the first address key pair including a private key and a public key, wherein the first cryptocurrency chain use an asymmetric encryption algorithm; convert the first blockchain data for the first cryptocurrency chain to normalized first blockchain data normalized across different blockchains, the convert the first blockchain data for the first cryptocurrency chain to the normalized first blockchain data including decomposing the first human readable address hash to first blockchain raw script hash bytes; receive second blockchain data for a second cryptocurrency chain from a second cryptocurrency chain participant node, the second blockchain data including a second cryptocurrency chain transaction block data including a signed second cryptocurrency transaction including a second human readable address hash and a second address key pair, the second address key pair including the private key, wherein the second cryptocurrency chain use the asymmetric encryption algorithm, the asymmetric encryption algorithm be the same in the first cryptocurrency chain and the second cryptocurrency chain; convert the second blockchain data for the second cryptocurrency chain to normalized second blockchain data normalized across different blockchains, the convert the second blockchain data for the second cryptocurrency chain to the normalized second blockchain data including decomposing the second human readable address hash to second blockchain raw script hash bytes; feed the normalized first blockchain data and the normalized second blockchain data to a clustering node, the clustering node comparing the first blockchain raw script hash bytes with the second blockchain raw script hash bytes, the comparing determining that the first blockchain raw script hash bytes are the same as the second blockchain raw script hash bytes; determine the signed first cryptocurrency transaction and the signed second cryptocurrency transaction be controlled by a same individual or entity based on the first blockchain raw script hash bytes be the same as the second blockchain raw script hash bytes; cluster the signed first cryptocurrency transaction and the signed second cryptocurrency transaction based on the determining the signed first cryptocurrency transaction and the signed second cryptocurrency transaction be controlled by the same individual or entity; and display an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction be controlled by the same individual or entity.

In some aspects, the techniques described herein relate to a system, wherein the one or more hardware processors are further configured by machine-readable instructions to: apply a multi-input heuristic node, the apply the multi-input heuristic node including feeding the normalized first blockchain data including the signed first cryptocurrency transaction and the normalized second blockchain data including the signed second cryptocurrency transaction to the multi-input heuristic node, the applying the multi-input heuristic node including the signed first cryptocurrency transaction and the signed second cryptocurrency transaction using the same private key; and link the signed first cryptocurrency transaction and the signed second cryptocurrency transaction to a known address based on the applying the multi-input heuristic node.

In some aspects, the techniques described herein relate to a system, wherein the one or more hardware processors are further configured by machine-readable instructions to: apply a lookback heuristic node, the apply the lookback heuristic node including feeding the normalized first blockchain data including the signed first cryptocurrency transaction and the normalized second blockchain data including the signed second cryptocurrency transaction to the lookback heuristic node, the applying the lookback heuristic node including pattern recognition in previous transactions from the signed first cryptocurrency transaction and signed second cryptocurrency transaction; and link the signed first cryptocurrency transaction and the signed second cryptocurrency transaction to a known address based on the applying the lookback heuristic node.

In some aspects, the techniques described herein relate to a system, applying a BitMex heuristic processing node, the applying the BitMex heuristic processing node including feeding the normalized first blockchain data including the signed first cryptocurrency transaction and the normalized second blockchain data including the signed second cryptocurrency transaction to the BitMex heuristic processing node, the applying the BitMex heuristic processing node including determining the signed first cryptocurrency transaction and the signed second cryptocurrency transaction use a vanity Bitcoin address, the vanity Bitcoin address including a prefix, the prefix including 3BMEX; and linking the signed first cryptocurrency transaction and the signed second cryptocurrency transaction to a known BitMex address based on the applying the BitMex heuristic processing node.

In some aspects, the techniques described herein relate to a system, wherein the one or more hardware processors are further configured by machine-readable instructions to: label the clustering the signed first cryptocurrency transaction and the signed second cryptocurrency transaction to a specific cryptocurrency.

In some aspects, the techniques described herein relate to a system, wherein the one or more hardware processors are further configured by machine-readable instructions to: assign the signed first cryptocurrency transaction a first integer for an integer-based index, and assigning the signed second cryptocurrency transaction a second integer for the integer-based index.

In some aspects, the techniques described herein relate to a system, wherein the first integer of the signed first cryptocurrency transaction, and the second integer for the signed second cryptocurrency transaction are the same integer, the same integer indicating the signed first cryptocurrency transaction and the signed second cryptocurrency transaction are controlled by the same individual or entity.

In some aspects, the techniques described herein relate to a system, wherein the first cryptocurrency chain and the second cryptocurrency chain are at least one of: Bitcoin (BTC), Ethereum (ETH), Litecoin (LTC), Cardano (ADA), Polkadot (DOT), Bitcoin Cash (BCH), Stellar (XLM), Dogecoin (DOGE), Binance Coin (BNB), Tether (USDT), Monero (XMR), USD Coin (USDC), and XRP (XRP).

In some aspects, the techniques described herein relate to a system, wherein the one or more hardware processors are further configured by machine-readable instructions to: apply a connected components processing node, the connected components processing node generating sub-graphs related addresses.

In some aspects, the techniques described herein relate to a system, wherein the one or more hardware processors are further configured by machine-readable instructions to: update the clustering the signed first cryptocurrency transaction and the signed second cryptocurrency transaction based on additional blockchain data.

In some aspects, the techniques described herein relate to a process, including: receiving first blockchain data for a first cryptocurrency chain from a first cryptocurrency chain participant node, the first blockchain data including a first cryptocurrency chain transaction block data including a signed first cryptocurrency transaction including a first human readable address hash and a first address key pair, the first address key pair including a private key and a public key, wherein the first cryptocurrency chain using an asymmetric encryption algorithm; converting the first blockchain data for the first cryptocurrency chain to normalized first blockchain data normalized across different blockchains, the converting the first blockchain data for the first cryptocurrency chain to the normalized first blockchain data including decomposing the first human readable address hash to first blockchain raw script hash bytes; receiving second blockchain data for a second cryptocurrency chain from a second cryptocurrency chain participant node, the second blockchain data including a second cryptocurrency chain transaction block data including a signed second cryptocurrency transaction including a second human readable address hash and a second address key pair, the second address key pair including the private key, wherein the second cryptocurrency chain using the asymmetric encryption algorithm, the asymmetric encryption algorithm being the same in the first cryptocurrency chain and the second cryptocurrency chain; converting the second blockchain data for the second cryptocurrency chain to normalized second blockchain data normalized across different blockchains, the converting the second blockchain data for the second cryptocurrency chain to the normalized second blockchain data including decomposing the second human readable address hash to second blockchain raw script hash bytes; feeding the normalized first blockchain data and the normalized second blockchain data to a clustering node, the clustering node comparing the first blockchain raw script hash bytes with the second blockchain raw script hash bytes, the comparing determining that the first blockchain raw script hash bytes are the same as the second blockchain raw script hash bytes; determining the signed first cryptocurrency transaction and the signed second cryptocurrency transaction being controlled by a same individual or entity based on the first blockchain raw script hash bytes being the same as the second blockchain raw script hash bytes; clustering the signed first cryptocurrency transaction and the signed second cryptocurrency transaction based on the determining the signed first cryptocurrency transaction and the signed second cryptocurrency transaction being controlled by the same individual or entity; and displaying an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction being controlled by the same individual or entity.

In some aspects, the techniques described herein relate to a process, further including applying a multi-input heuristic node, the applying the multi-input heuristic node including feeding the normalized first blockchain data including the signed first cryptocurrency transaction and the normalized second blockchain data including the signed second cryptocurrency transaction to the multi-input heuristic node, the applying the multi-input heuristic node including the signed first cryptocurrency transaction and the signed second cryptocurrency transaction using the same private key; and linking the signed first cryptocurrency transaction and the signed second cryptocurrency transaction to a known address based on the applying the multi-input heuristic node.

In some aspects, the techniques described herein relate to a process, further including applying a lookback heuristic node, the applying the lookback heuristic node including feeding the normalized first blockchain data including the signed first cryptocurrency transaction and the normalized second blockchain data including the signed second cryptocurrency transaction to the lookback heuristic node, the applying the lookback heuristic node including pattern recognition in previous transactions from the signed first cryptocurrency transaction and signed second cryptocurrency transaction; and linking the signed first cryptocurrency transaction and the signed second cryptocurrency transaction to a known address based on the applying the lookback heuristic node.

In some aspects, the techniques described herein relate to a process, applying a BitMex heuristic processing node, the applying the BitMex heuristic processing node including feeding the normalized first blockchain data including the signed first cryptocurrency transaction and the normalized second blockchain data including the signed second cryptocurrency transaction to the BitMex heuristic processing node, the applying the BitMex heuristic processing node including determining the signed first cryptocurrency transaction and the signed second cryptocurrency transaction use a vanity Bitcoin address, the vanity Bitcoin address including a prefix, the prefix including 3BMEX; and linking the signed first cryptocurrency transaction and the signed second cryptocurrency transaction to a known BitMex address based on the applying the BitMex heuristic processing node.

In some aspects, the techniques described herein relate to a process, further including labeling the clustering the signed first cryptocurrency transaction and the signed second cryptocurrency transaction to a specific cryptocurrency.

In some aspects, the techniques described herein relate to a process, further including assigning the signed first cryptocurrency transaction a first integer for an integer-based index, and assigning the signed second cryptocurrency transaction a second integer for the integer-based index.

In some aspects, the techniques described herein relate to a process, wherein the first integer of the signed first cryptocurrency transaction, and the second integer for the signed second cryptocurrency transaction are the same integer, the same integer indicating the signed first cryptocurrency transaction and the signed second cryptocurrency transaction are controlled by the same individual or entity.

In some aspects, the techniques described herein relate to a process, wherein the first cryptocurrency chain and the second cryptocurrency chain are at least one of: Bitcoin (BTC), Ethereum (ETH), Litecoin (LTC), Cardano (ADA), Polkadot (DOT), Bitcoin Cash (BCH), Stellar (XLM), Dogecoin (DOGE), Binance Coin (BNB), Tether (USDT), Monero (XMR), USD Coin (USDC), and XRP (XRP).

In some aspects, the techniques described herein relate to a process, further including applying a connected components processing node, the connected components processing node generating sub-graphs related addresses.

In some aspects, the techniques described herein relate to a process, further including updating the clustering the signed first cryptocurrency transaction and the signed second cryptocurrency transaction based on additional blockchain data.

BRIEF DESCRIPTION OF THE DRAWINGS

FIG. 4 illustrates a graphical user interface (GUI) displaying a cluster of a cryptocurrency address mapping space, according to various embodiments of the present technology.

FIG. 5 illustrates another graphical user interface (GUI) displaying a cluster of a cryptocurrency address mapping space, according to various embodiments of the present technology.

DETAILED DESCRIPTION

In various embodiments, a high-level architecture is a multichain architecture that finds commonality between currency chains by inputting various blockchain data, converting the blockchain data to a normalized form so that the normalized blockchain data is consistent across different blockchains (e.g., Bitcoin, Ethereum, Litecoin, and the like). In some instances, feeding the normalized blockchain data (i.e., consistent across blockchains) through a series of different clustering nodes enables finding commonality between currency chains. For example, a signed bitcoin transaction, may be asserted that all the inputs belong to/are owned by a same individual or entity because the same individual or entity had to have had access to all the private keys for all of the inputs. For instance, for each of two input addresses that used the same private keys to sign the overall transactions the present technology enables the indication that the individual or entity that generated the transaction owns those two input addresses, and the two input addresses are related to one another.

Figure 1:
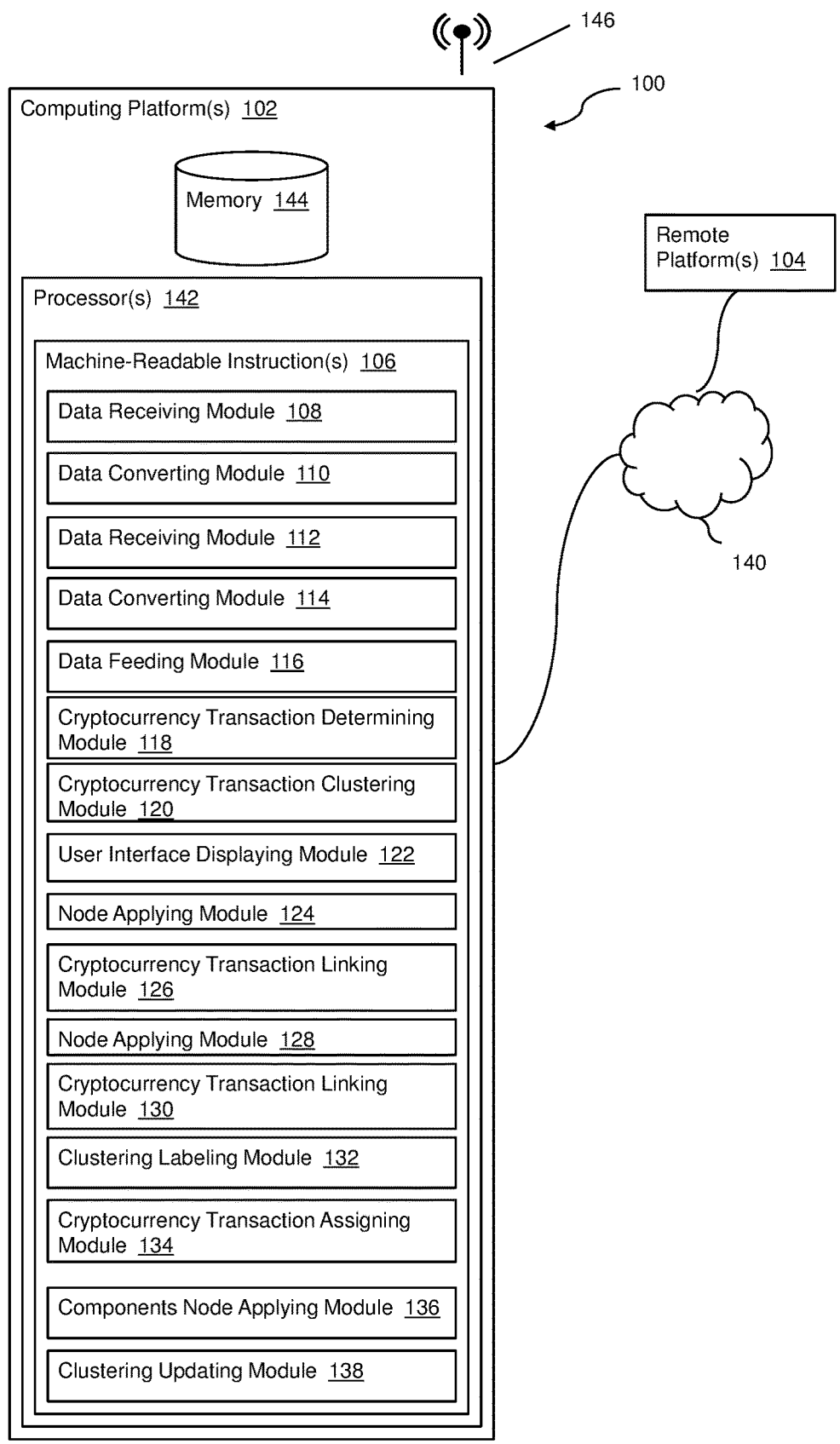
FIG. 1 illustrates a system configured for generating a single cryptocurrency address mapping space for a plurality of cryptocurrencies including a global map of activity for the plurality of cryptocurrencies by clustering different addresses used in separate cryptocurrency transactions that are controlled by a same individual or entity, according to various embodiments of the present technology.

FIG. 1 illustrates a system configured for generating a single cryptocurrency address mapping space for a plurality of cryptocurrencies including a global map of activity for the plurality of cryptocurrencies by clustering different addresses used in separate cryptocurrency transactions that are controlled by a same individual or entity, in accordance with one or more embodiments. In some cases, system 100 may include one or more computing platforms 102. The one or more computing platforms 102 may be communicably coupled with one or more remote platforms 104. In some cases, users may access the system 100 via remote platform(s) 104.

The one or more computing platforms 102 may be configured by machine-readable instructions 106. Machine-readable instructions 106 may include modules. The modules may be implemented as one or more of functional logic, hardware logic, electronic circuitry, software modules, and the like. The modules may include one or more of data receiving module 108, data converting module 110, data receiving module 112, data converting module 114, data feeding module 116, cryptocurrency transaction determining module 118, cryptocurrency transaction clustering module 120, user interface displaying module 122, node applying module 124, cryptocurrency transaction linking module 126, node applying module 128, cryptocurrency transaction linking module 130, clustering labeling module 132, cryptocurrency transaction assigning module 134, components node applying module 136, clustering updating module 138, and/or other modules.

Data receiving module 108 may be configured to receive first blockchain data for a first cryptocurrency chain from a first cryptocurrency chain participant node, the first blockchain data comprising a first cryptocurrency chain transaction block data including a signed first cryptocurrency transaction including a first human readable address hash and a first address key pair, the first address key pair including a private key and a public key. The first cryptocurrency chain uses an asymmetric encryption algorithm. Data converting module 110 may be configured to convert the first blockchain data for the first cryptocurrency chain to normalized first blockchain data normalized across different blockchains, the convert the first blockchain data for the first cryptocurrency chain to the normalized first blockchain data comprising decomposing the first human readable address hash to first blockchain raw script hash bytes. Data receiving module 112 may be configured to receive second blockchain data for a second cryptocurrency chain from a second cryptocurrency chain participant node, the second blockchain data comprising a second cryptocurrency chain transaction block data including a signed second cryptocurrency transaction including a second human readable address hash and a second address key pair, the second address key pair including the private key. The second cryptocurrency chain uses the asymmetric encryption algorithm, the asymmetric encryption algorithm being the same in the first cryptocurrency chain and the second cryptocurrency chain. Data converting module 114 may be configured to convert the second blockchain data for the second cryptocurrency chain to normalized second blockchain data normalized across different blockchains, the convert the second blockchain data for the second cryptocurrency chain to the normalized second blockchain data comprising decomposing the second human readable address hash to second blockchain raw script hash bytes. Data feeding module 116 may be configured to feed the normalized first blockchain data and the normalized second blockchain data to a clustering node, the clustering node comparing the first blockchain raw script hash bytes with the second blockchain raw script hash bytes, the comparing determining that the first blockchain raw script hash bytes are the same as the second blockchain raw script hash bytes. Cryptocurrency transaction determining module 118 may be configured to determine the signed first cryptocurrency transaction and the signed second cryptocurrency transaction are controlled by a same individual or entity based on the first blockchain raw script hash bytes being the same as the second blockchain raw script hash bytes. Cryptocurrency transaction clustering module 120 may be configured to cluster the signed first cryptocurrency transaction and the signed second cryptocurrency transaction based on the determining the signed first cryptocurrency transaction and the signed second cryptocurrency transaction are controlled by the same individual or entity. User interface displaying module 122 may be configured to display an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction are controlled by the same individual or entity.

Node applying module 124 may be configured to apply a multi-input heuristic node, the applying the multi-input heuristic node comprising the signed first cryptocurrency transaction and the signed second cryptocurrency transaction using the same private key. Cryptocurrency transaction linking module 126 may be configured to link the signed first cryptocurrency transaction and the signed second cryptocurrency transaction to a known address based on the applying the multi-input heuristic node.

Node applying module 128 may be configured to apply a lookback heuristic node, the applying the lookback heuristic node comprising pattern recognition in previous transactions from the signed first cryptocurrency transaction and signed second cryptocurrency transaction. Cryptocurrency transaction linking module 130 may be configured to link the signed first cryptocurrency transaction and the signed second cryptocurrency transaction to a known address based on the applying the lookback heuristic node.

Clustering labeling module 132 may be configured to label the clustering the signed first cryptocurrency transaction and the signed second cryptocurrency transaction to a specific cryptocurrency.

Cryptocurrency transaction assigning module 134 may be configured to assign the signed first cryptocurrency transaction a first integer for an integer-based index, and assigning the signed second cryptocurrency transaction a second integer for the integer-based index. In some cases, the first integer of the signed first cryptocurrency transaction, and the second integer for the signed second cryptocurrency transaction may be the same integer, the same integer indicating the signed first cryptocurrency transaction and the signed second cryptocurrency transaction may be controlled by the same individual or entity.

In some cases, the first cryptocurrency chain and the second cryptocurrency chain may be at least one of: Bitcoin, Ethereum, Litecoin, Cardano, Polkadot, Bitcoin Cash, Stellar, Dogecoin, Binance Coin, Tether, Monero, USD Coin, and XRP.

Components node applying module 136 may be configured to apply a connected components processing node, the connected components processing node generating subgraphs related addresses.

Clustering updating module 138 may be configured to update the clustering the signed first cryptocurrency transaction and the signed second cryptocurrency transaction based on additional blockchain data.

In some cases, the one or more computing platforms 102, may be communicatively coupled to the remote platform(s) 104. In some cases, the communicative coupling may include communicative coupling through a networked environment 140. The networked environment 140 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 102 and remote platform(s) 104 may be operatively linked via some other communication coupling. The one or more one or more computing platforms 102 may be configured to communicate with the networked environment 140 via wireless or wired connections. In addition, in an embodiment, the one or more computing platforms 102 may be configured to communicate directly with each other via wireless or wired connections. Examples of one or more computing platforms 102 may include, but is not limited to, smartphones, wearable devices, tablets, laptop computers, desktop computers, Internet of Things (IoT) device, or other mobile or stationary devices. In an embodiment, system 100 may also include one or more hosts or servers, such as the one or more remote platforms 104 connected to the networked environment 140 through wireless or wired connections. According to one embodiment, remote platforms 104 may be implemented in or function as base stations (which may also be referred to as Node Bs or evolved Node Bs (eNBs)). In other embodiments, remote platforms 104 may include web servers, mail servers, application servers, and the like. According to certain embodiments, remote platforms 104 may be stand-alone servers, networked servers, or an array of servers.

The one or more computing platforms 102 may include one or more processors 142 for processing information and executing instructions or operations. One or more processors 142 may be any type of general or specific purpose processor. In some cases, one or more processor processors 142 may be utilized according to other embodiments. In fact, the one or more processors 142 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors 142 may be remote from the one or more computing platforms 102, such as disposed within a remote platform like the one or more remote platforms 104 of FIG. 1.

The one or more processors 142 may perform functions associated with the operation of system 100 which may include, for example, precoding of antenna gain/phase parameters, encoding and decoding of individual bits forming a communication message, formatting of information, and overall control of the one or more computing platforms 102, including processes related to management of communication resources.

The one or more computing platforms 102 may further include or be coupled to a memory 144 (internal or external), which may be coupled to one or more processors 142, for storing information and instructions that may be executed by one or more processors 142. Memory 144 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 144 can consist of any combination of random-access memory (RAM), read only memory (ROM), static storage such as a magnetic or optical disk, hard disk drive (HDD), or any other type of non-transitory machine or computer readable media. The instructions stored in memory 144 may include program instructions or computer program code that, when executed by one or more processors 142, enable the one or more computing platforms 102 to perform tasks as described herein.

In some embodiments, one or more computing platforms 102 may also include or be coupled to one or more antennas 146 for transmitting and receiving signals and/or data to and from one or more computing platforms 102. The one or more antennas 146 may be configured to communicate via, for example, a plurality of radio interfaces that may be coupled to the one or more antennas 146. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

Figure 2A:
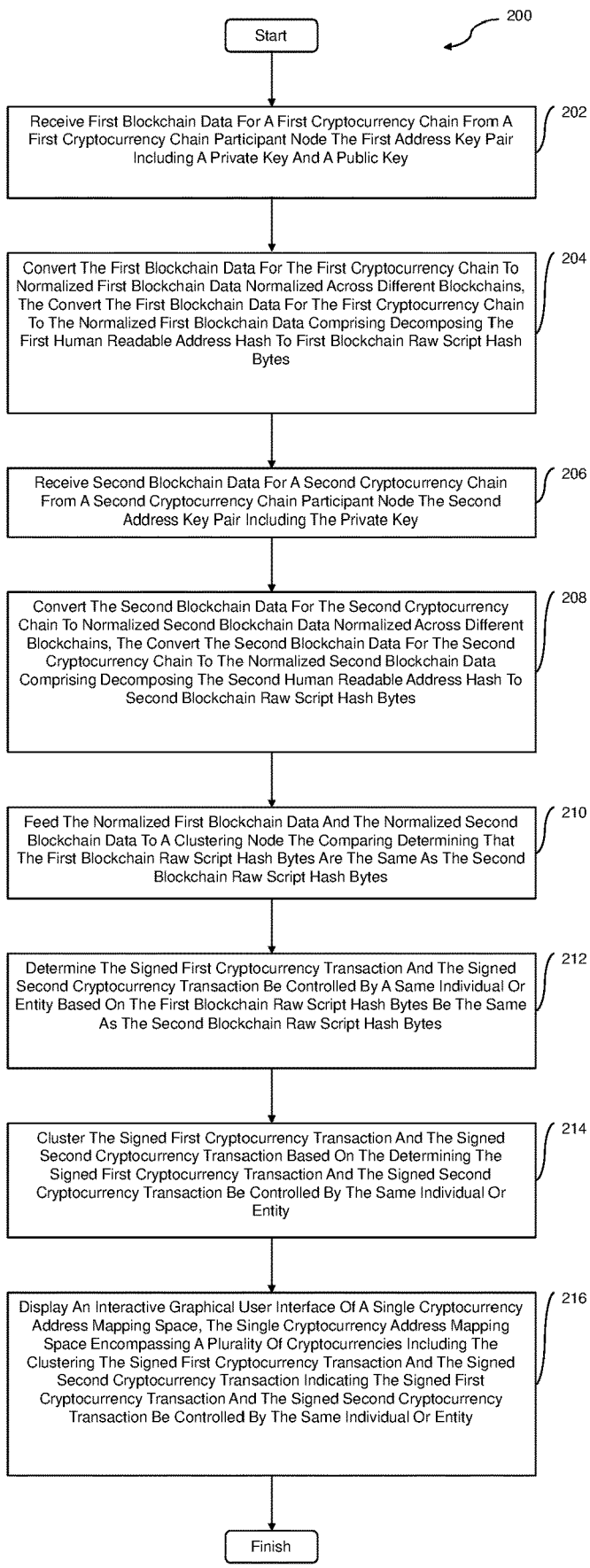
FIG. 2A though
Figure 2B:
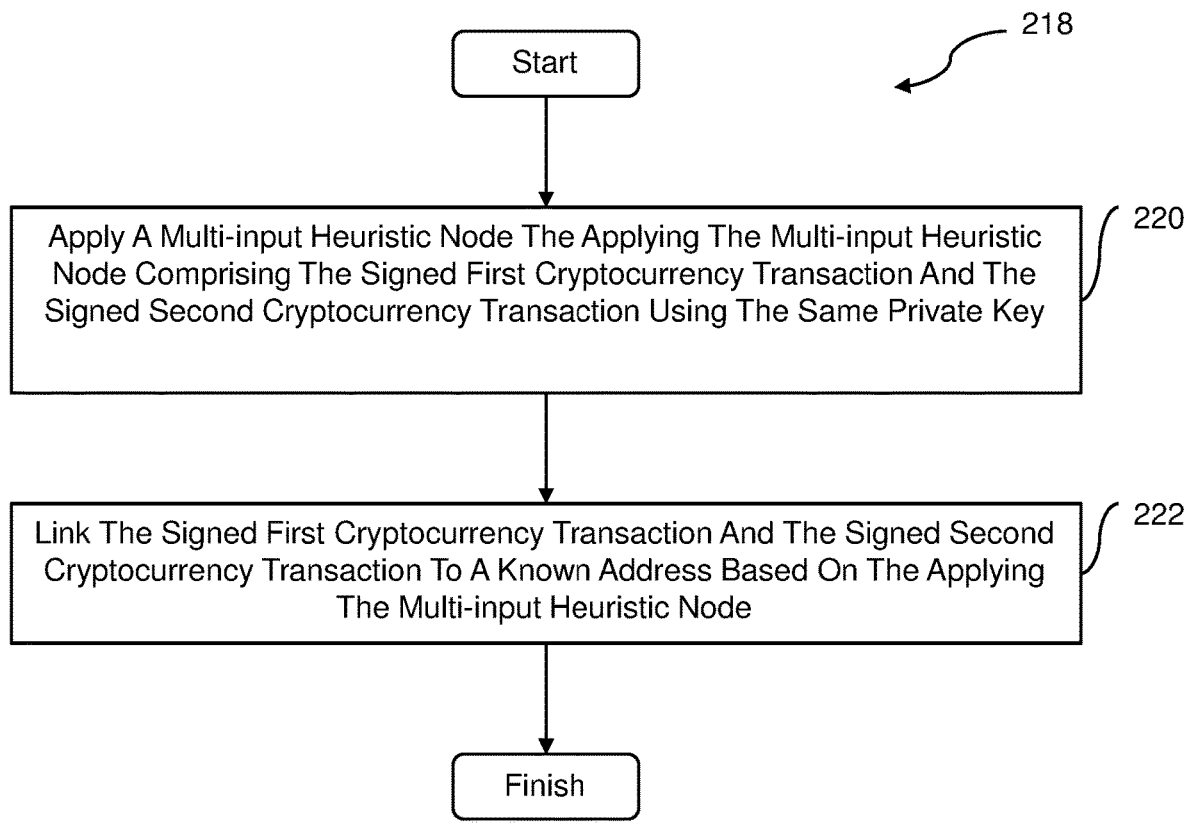
FIG. 2G illustrates a method for generating a single cryptocurrency address mapping space for a plurality of cryptocurrencies including a global map of activity for the plurality of cryptocurrencies by clustering different addresses used in separate cryptocurrency transactions that are controlled by a same individual or entity, according to various embodiments of the present technology.
Figure 2C:
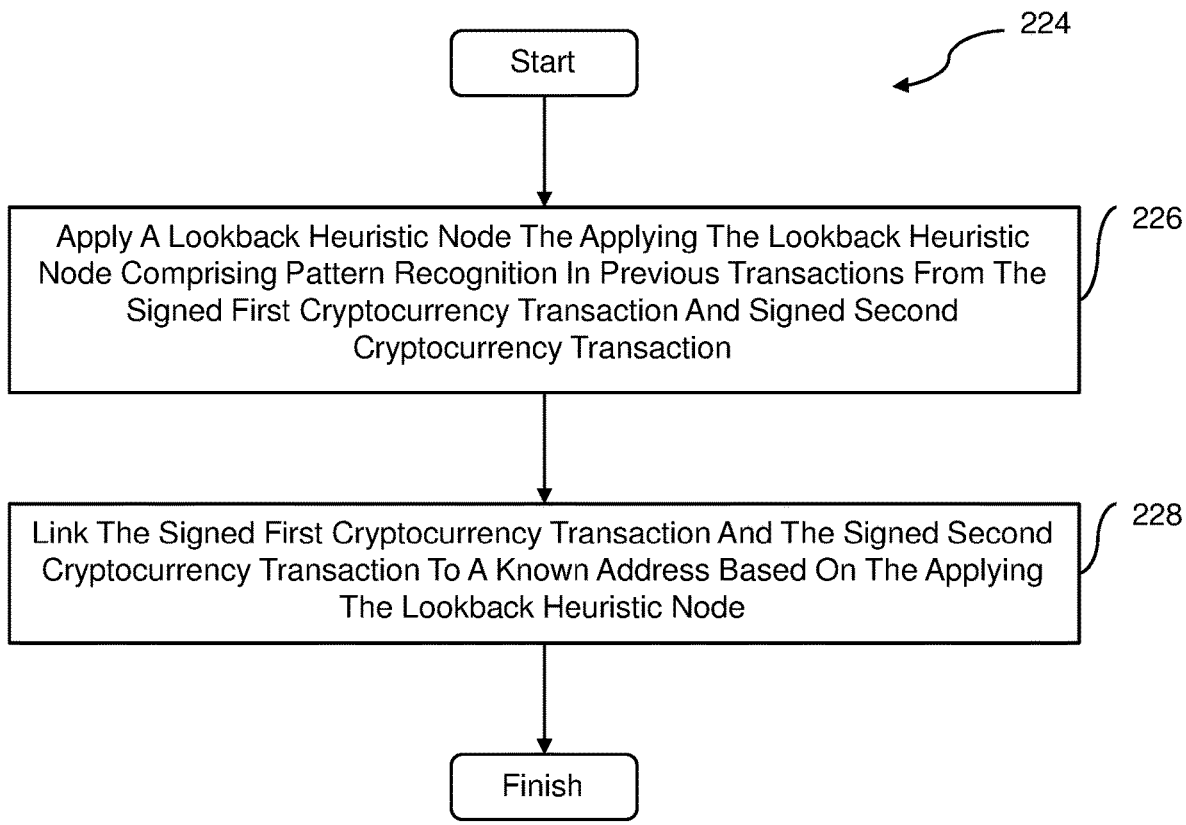
Figure 2D:
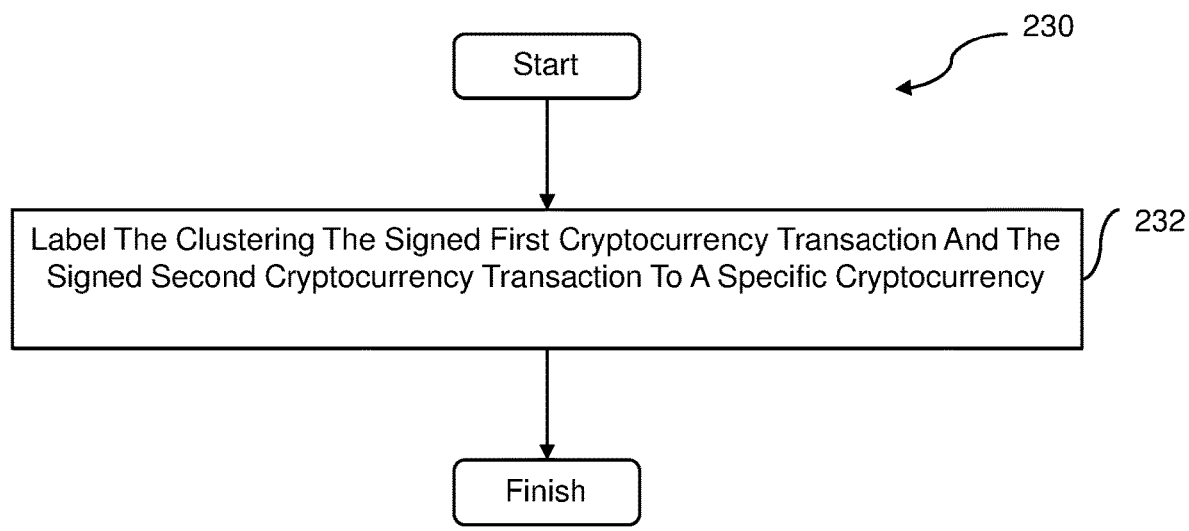
Figure 2E:
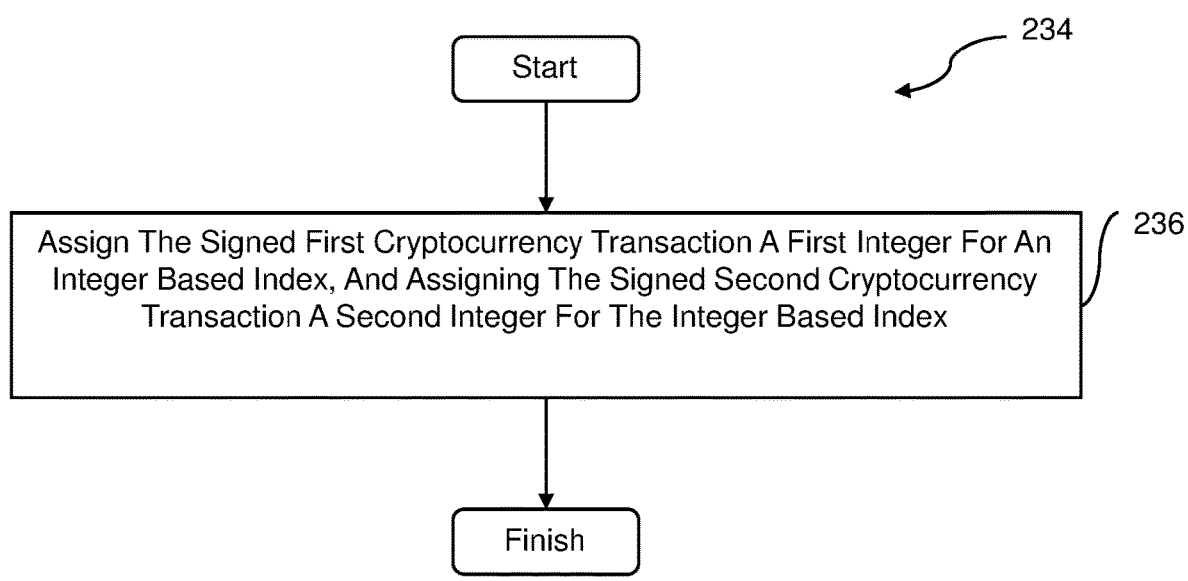
Figure 2F:
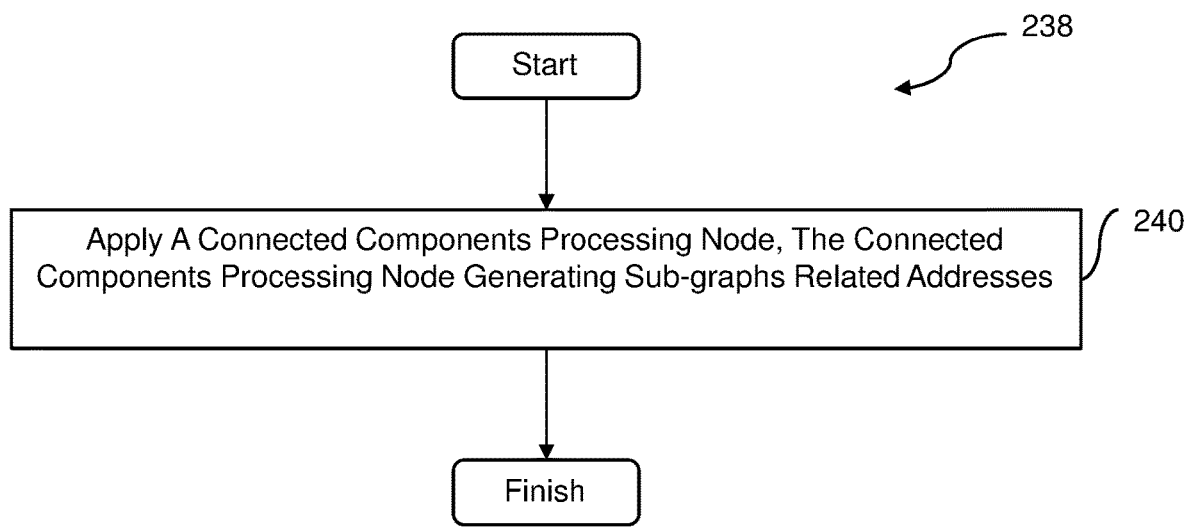
Figure 2G:
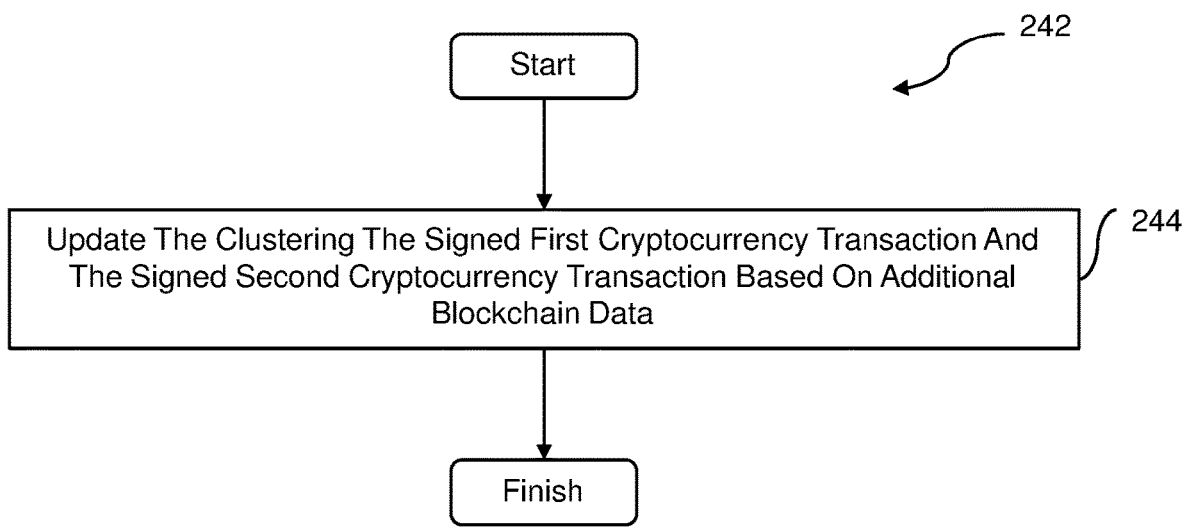

FIG. 2A, FIG. 2B, FIG. 2C, FIG. 2D, FIG. 2E, FIG. 2F and/or FIG. 2G illustrate an example flow diagram of a method 200, according to one embodiment. The method 200 may include receiving first blockchain data for a first cryptocurrency chain from a first cryptocurrency chain participant node, the first blockchain data comprising a first cryptocurrency chain transaction block data including a signed first cryptocurrency transaction including a first human readable address hash and a first address key pair, the first address key pair including a private key and a public key at block 202, the first cryptocurrency chain using an asymmetric encryption algorithm. The method 200 may include converting the first blockchain data for the first cryptocurrency chain to normalized first blockchain data normalized across different blockchains, the converting the first blockchain data for the first cryptocurrency chain to the normalized first blockchain data comprising decomposing the first human readable address hash to first blockchain raw script hash bytes at block 204. The method 200 may include receiving second blockchain data for a second cryptocurrency chain from a second cryptocurrency chain participant node, the second blockchain data comprising a second cryptocurrency chain transaction block data including a signed second cryptocurrency transaction including a second human readable address hash and a second address key pair, the second address key pair including the private key at block 206, the second cryptocurrency chain using the asymmetric encryption algorithm, the asymmetric encryption algorithm being the same in the first cryptocurrency chain and the second cryptocurrency chain. The method 200 may include converting the second blockchain data for the second cryptocurrency chain to normalized second blockchain data normalized across different blockchains, the converting the second blockchain data for the second cryptocurrency chain to the normalized second blockchain data comprising decomposing the second human readable address hash to second blockchain raw script hash bytes at block 208. The method 200 may include feeding the normalized first blockchain data and the normalized second blockchain data to a clustering node, the clustering node comparing the first blockchain raw script hash bytes with the second blockchain raw script hash bytes, the comparing determining that the first blockchain raw script hash bytes are the same as the second blockchain raw script hash bytes at block 210. The method 200 may include determining the signed first cryptocurrency transaction and the signed second cryptocurrency transaction being controlled by a same individual or entity based on the first blockchain raw script hash bytes being the same as the second blockchain raw script hash bytes at block 212. The method 200 may include clustering the signed first cryptocurrency transaction and the signed second cryptocurrency transaction based on the determining the signed first cryptocurrency transaction and the signed second cryptocurrency transaction being controlled by the same individual or entity at block 214. The method 200 may include displaying an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction being controlled by the same individual or entity at block 216.

In FIG. 2B, the method 200 may be continued at 218, and may further include applying a multi-input heuristic node the applying the multi-input heuristic node comprising the signed first cryptocurrency transaction and the signed second cryptocurrency transaction using the same private key at block 220. The method 200 continued at 218 may also further include linking the signed first cryptocurrency transaction and the signed second cryptocurrency transaction to a known address based on the applying the multi-input heuristic node at block 222.

In FIG. 2C, the method 200 may be continued at 224, and may further include applying a lookback heuristic node the applying the lookback heuristic node comprising pattern recognition in previous transactions from the signed first cryptocurrency transaction and signed second cryptocurrency transaction at block 226.

The method 200 continued at 224 may also further include linking the signed first cryptocurrency transaction and the signed second cryptocurrency transaction to a known address based on the applying the lookback heuristic node at block 228.

In FIG. 2D, the method 200 may be continued at 230, and may further include labeling the clustering the signed first cryptocurrency transaction and the signed second cryptocurrency transaction to a specific cryptocurrency at block 232.

In FIG. 2E, the method 200 may be continued at 234, and may further include assigning the signed first cryptocurrency transaction a first integer for an integer-based index, and assigning the signed second cryptocurrency transaction a second integer for the integer-based index at block 236.

In FIG. 2F, the method 200 may be continued at 238, and may further include applying a connected components processing node, the connected components processing node generating sub-graphs related addresses at block 240.

In FIG. 2G, the method 200 may be continued at 242, and may further include updating the clustering the signed first cryptocurrency transaction and the signed second cryptocurrency transaction based on additional blockchain data at block 244.

In some cases, the method 200 may be performed by one or more hardware processors, such as the processors 142 of FIG. 1, configured by machine-readable instructions, such as the machine-readable instructions 106 of FIG. 1. In this aspect, the method 200 may be configured to be implemented by the modules, such as data receiving module 108, data converting module 110, data receiving module 112, data converting module 114, data feeding module 116, cryptocurrency transaction determining module 118, cryptocurrency transaction clustering module 120, user interface displaying module 122, node applying module 124, cryptocurrency transaction linking module 126, node applying module 128, cryptocurrency transaction linking module 130, clustering labeling module 132, cryptocurrency transaction assigning module 134, components node applying module 136 and/or clustering updating module 138 discussed above in FIG. 1.

Figure 3:
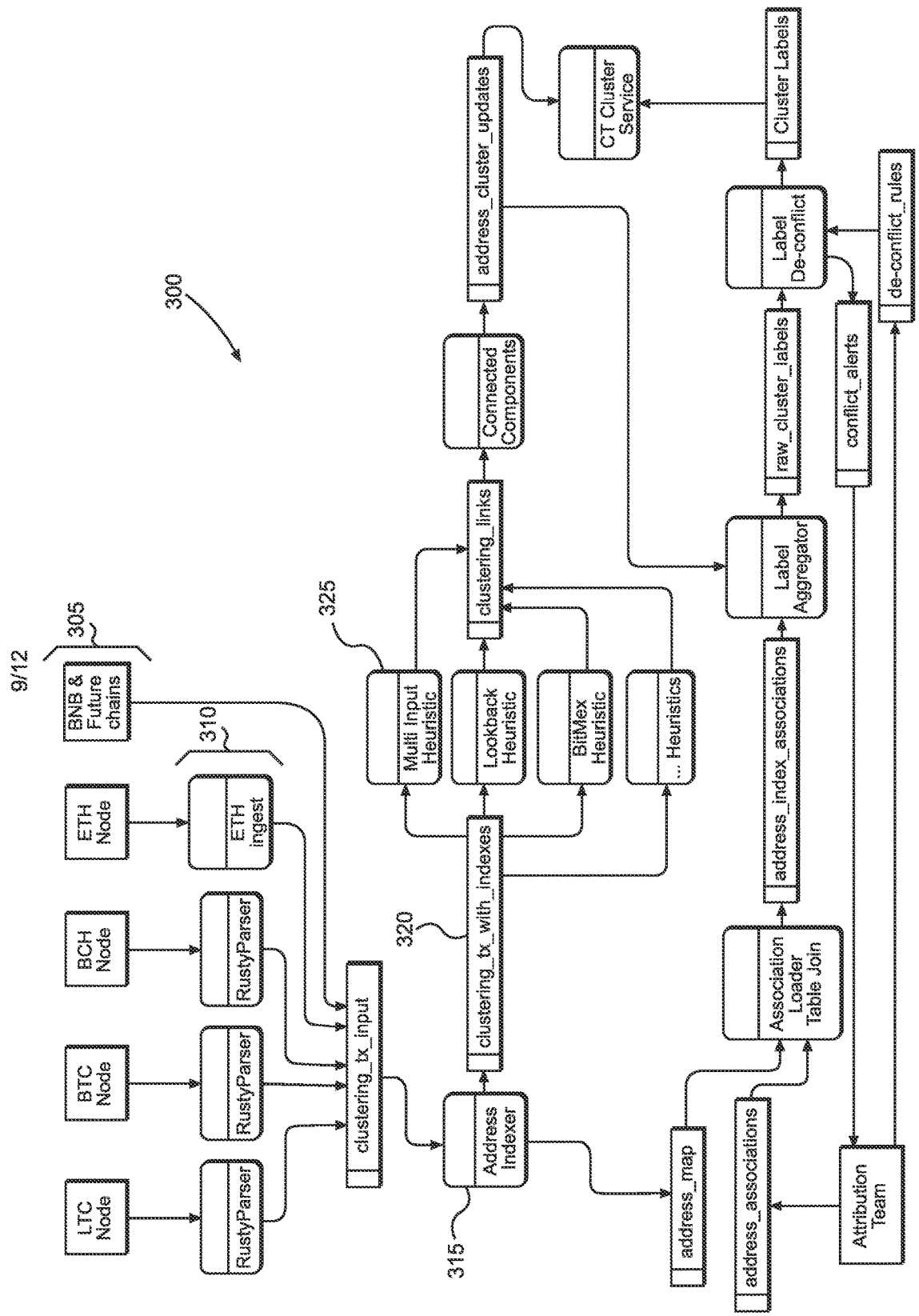
FIG. 3 illustrates system architecture for generating a single cryptocurrency address mapping space for a plurality of cryptocurrencies including a global map of activity for the plurality of cryptocurrencies by clustering different addresses used in separate cryptocurrency transactions that are controlled by a same individual or entity, according to various embodiments of the present technology.

FIG. 3 illustrates system architecture 300 for generating a single cryptocurrency address mapping space for a plurality of cryptocurrencies including a global map of activity for the plurality of cryptocurrencies by clustering different addresses used in separate cryptocurrency transactions that are controlled by a same individual or entity, according to various embodiments of the present technology.

FIG. 3 displays raw blockchain nodes 305 that are being ingested by the present technology. For example, the raw blockchain nodes 305 may be a node, Bitcoin (BTC) node, an Ethereum (ETH) node, a Litecoin (LTC) node, a Cardano (ADA) node, a Polkadot (DOT) node, a Bitcoin Cash (BCH) node, a Stellar (XLM) node, a Dogecoin (DOGE) node, a Binance Coin (BNB) node, a Tether (USDT) node, a Monero (XMR) node, a USD Coin (USDC) node, and a XRP (XRP) node. For instance, the raw blockchain nodes 305 may be a participant node in the blockchain's network.

FIG. 3 displays a parser 310. For example, a parser is a compiler or interpreter component that breaks data into smaller elements for easy translation into another language. A parser takes input in the form of a sequence of tokens, interactive commands, or program instructions and breaks them up into parts that can be used by other components in programming. For example, the parser 310 may be rusty parser that takes chain specific form of data from the raw blockchain nodes 305 and converts that data to a cross-chain normalization normalized form that can represent any cryptocurrency chain. In other words, normalization of the raw blockchain data.

FIG. 3 displays an address indexer 315. For example, the cross-chain normalization normalized form gets pushed into a shared message bus and the present technology may use the address indexer 315. For example, the address indexer 315 may store raw address information and assigns each new address to a sequential integer-based index that enables the present technology to have efficiently analyze and use storage and access downstream. FIG. 3 further displays clustering transaction indexer 320. For example, two address with the same raw script hash may both assigned to a same address index using clustering transaction indexer 320.

FIG. 3 displays heuristic processing layer 325. For example, heuristic processing layer 325 may include multi-input heuristic node, lookback heuristic node, and BitMex heuristic processing node.

In various embodiments, the present technology creates a single address mapping space which encompasses all crypto currencies, which paints a global map of cryptocurrency activity and allows activity on one chain to affect other chains. In some instances, in order to achieve this the present technology finds addresses (key pairs) which are shared between chains. Given that many chains use the same asymmetric encryption algorithm (ECC) the present technology enables finding addresses that are used in multiple chains.

In various embodiments, the present technology decomposes the human readable address hash form to the raw components so that shared addresses may be found. For example, different cryptocurrencies represent the same key, for example, two addressees, a Bitcoin (BTC) address and a Litecoin (LTC) address that represent the same key are shown below.

Bitcoin (BTC) Address: 3B9iu2cGmp9TKDdZfvHgHLxm8TCRdz1mhy

Litecoin (LTC) Address: MHMsCv2Eivzt7iuTmoH26zDAT9Ns8VHDwA

In this example, both of these addresses are P2SH (pay to script hash) addresses. Since LTC and BTC share the same fundamental block chain technology the present technology enables that two equal script hashes represent the same actual script, thus, all encapsulated public keys are shared as well.

The present technology enables decomposing the BTC address (3B9iu2cGmp9TKDdZfvHgHLxm8TCRdz1mhy) to the raw components and the hash of the referenced script is shown below.

For the Bitcoin (BTC) address: 3B9iu2cGmp9TKDdZfvHgHLxm8TCRDz1mhy the raw script hash bytes are:

0X01, 0X67, 0XC6, 0X26, 0X7B, 0XFE, 0X04, 0X38, 0X75, 0X93, 0X51, 0XA3, 0X32, X8A, 0X42, 0X93, 0X0F, 0X3B, 0XF0, 0X30, 0XA1.

And similarly, the Litecoin (LTC) address: MHMsCv2Eivzt7iuTmoH26zDAT9ns8VHDwA the present technology enables decomposing the Litecoin (LTC) address that has the same script hash bytes:

0X01, 0X67, 0XC6, 0X26, 0X7B, 0XFE, 0X04, 0X38, 0X75, 0X93, 0X51, 0XA3, 0X32, X8A, 0X42, 0X93, 0X0F, 0X3B, 0XF0, 0X30, 0XA1.

The present technology enables that the two addresses have the same script hash bytes and that the script and public keys associated with these two addresses (e.g., Bitcoin (BTC) address: 3B9iu2cGmp9TKDdZfvHgHLxm 8TCR Dz1mhy and Litecoin (LTC) address: MHMsCv2 Eivzt7iuTmoH26zDAT9ns8VHDwA) are the same, and therefore both belong to the same entity and cluster. In various embodiments a technical improvement of the present technology is decomposing a human readable address hash to blockchain raw script hash bytes for clustering different addresses that are used in separate cryptocurrency transactions to allow determining addresses that are controlled by a same individual or entity. The improvement is faster processing of addresses for clustering and decreased use of computing power.

FIG. 4 illustrates a graphical user interface (GUI) 400 displaying a cluster of a cryptocurrency address mapping space, according to various embodiments of the present technology. The graphical user interface (GUI) 400 of FIG. 4 is an embodiment of displaying an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction being controlled by the same individual or entity. For example, FIG. 4 displays the graphical user interface (GUI) 400 including an asset type 405. For example, the asset type may be Bitcoin (BTC). FIG. 4 further shows a cluster of addresses 410 (e.g., a list of addresses) that belong within a cluster. For example, a list of actual Bitcoin (BTC) addresses in a human readable form, which are publicly visible are shown in a column. FIG. 4 further shows a balance 415 of the asset type 405. For example, the balance 415 may be a number of Bitcoins currently held by an addresses. FIG. 4 further displays a number of transactions received 420. For example, the number of transactions received 420 may be an indication of where the addresses received Bitcoins for a transaction. FIG. 4 further displays a total amount of liquidity received 425. For example, the total amount of liquidity received 425 may be a number of transactions where the address sent cryptocurrency and the total amount of cryptocurrency sent from the address. FIG. 4 further displays a Cluster ID 430. For example, the Cluster ID 430 may be a public version of whatever ID is assigned to the cluster of addresses (cluster of addresses 410).

FIG. 4 further displays an owner of the cluster 435. For example, a cryptocurrency exchange such as Changelly.com. FIG. 4 further displays a Country 440 location of an address. FIG. 4 further displays an address count 445. For example, the address count 445 may be a total number of addresses in this the cluster of addresses 410 (i.e., number of addresses in the cluster of addresses 410 which is two-hundred-and-twenty-seven-thousand-three-hundred-and-twenty-four).

FIG. 5 illustrates another graphical user interface (GUI) 500 displaying a cluster of a cryptocurrency address mapping space, according to various embodiments of the present technology. The graphical user interface (GUI) 500 of FIG. 5 is an embodiment of displaying an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction being controlled by the same individual or entity. For example, FIG. 5 displays the graphical user interface (GUI) 500 including an asset type 505. For example, the asset type may be Litecoin (LTC). FIG. 5 further shows a cluster of addresses 510 (e.g., a list of addresses) that belong within a cluster. For example, a list of actual Litecoin (LTC) addresses in a human readable form, which are publicly visible are shown in a column. FIG. 5 further shows a balance 515 of the asset type 505. For example, the balance 515 may be a number of Litecoins currently held by an addresses. FIG. 5 further displays a number of transactions received 520. For example, the number of transactions received 520 may be an indication of where the addresses received Litecoins for a transaction.

FIG. 5 further displays a total amount of liquidity received 525. For example, the total amount of liquidity received 525 may be a number of transactions where the address sent cryptocurrency and the total amount of cryptocurrency sent from the address. FIG. 5 further displays a Cluster ID 530. For example, the Cluster ID 530 may be a public version of whatever ID is assigned to the cluster of addresses (cluster of addresses 510).

FIG. 5 further displays an owner of the cluster 535. For example, a cryptocurrency exchange such as Poloniex.com. FIG. 5 further displays a Country 550 location of an address. FIG. 5 further displays an address count 555. For example, the address count 555 may be a total number of addresses in this the cluster of addresses 510 (i.e., number of addresses in the cluster of addresses 510 which is two-hundred-and-eighty-eight-thousand-four-hundred-and-forty-four).

Figure 6:
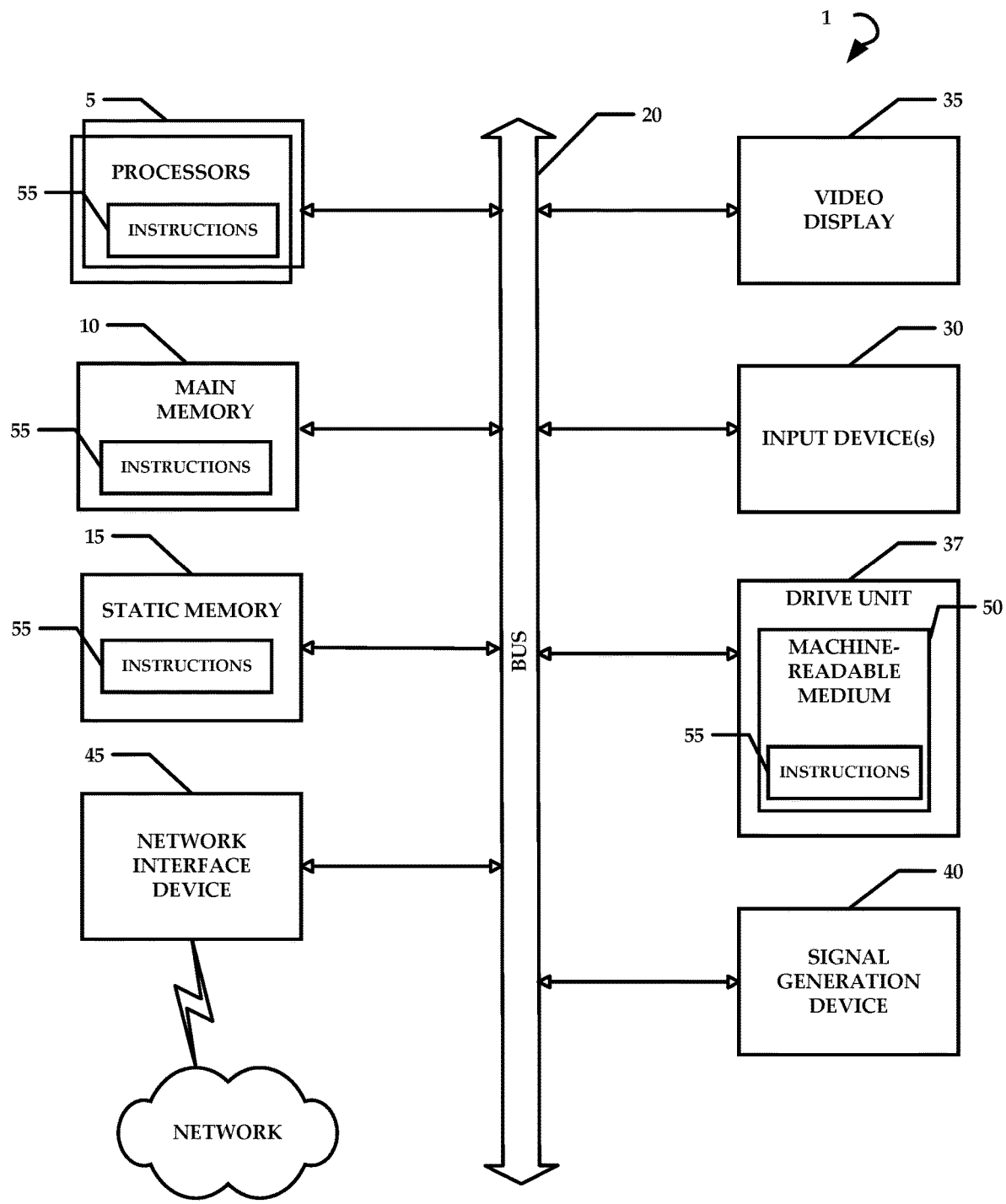
FIG. 6 illustrates an exemplary computer system that may be used to implement embodiments of the present disclosure, according to various embodiments of the present technology.

FIG. 6 illustrates an exemplary computer system that may be used to implement embodiments of the present disclosure, according to various embodiments of the present technology. The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiments in many different forms, there is shown in the drawings and has been described in detail several specific embodiments with the understanding that the present disclosure is to be considered as an exemplification of the principles of the present technology and is not intended to limit the present technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the present technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the present technology as defined by the appended claims and otherwise appreciated by one of ordinary skill in the art. The scope of the present technology should, therefore, be determined not with reference to the above description, but instead should be determined with reference to the appended claims along with their full scope of equivalents.

What is claimed is:

1. A system, comprising:
one or more hardware processors configured by machine-readable instructions to:
receive first blockchain data for a first cryptocurrency chain from a first cryptocurrency chain participant node, the first blockchain data comprising a first cryptocurrency chain transaction block data including a signed first cryptocurrency transaction including a first human readable address hash and a first address key pair, the first address key pair including a private key and a public key, wherein the first cryptocurrency chain use an asymmetric encryption algorithm;

convert the first blockchain data for the first cryptocurrency chain to normalized first blockchain data normalized across different blockchains, the convert the first blockchain data for the first cryptocurrency chain to the normalized first blockchain data comprising decomposing the first human readable address hash to first blockchain raw script hash bytes;

receive second blockchain data for a second cryptocurrency chain from a second cryptocurrency chain participant node, the second blockchain data comprising a second cryptocurrency chain transaction block data including a signed second cryptocurrency transaction including a second human readable address hash and a second address key pair, the second address key pair including the private key, wherein the second cryptocurrency chain use the asymmetric encryption algorithm, the asymmetric encryption algorithm be the same in the first cryptocurrency chain and the second cryptocurrency chain;

convert the second blockchain data for the second cryptocurrency chain to normalized second blockchain data normalized across different blockchains, the convert the second blockchain data for the second cryptocurrency chain to the normalized second blockchain data comprising decomposing the second human readable address hash to second blockchain raw script hash bytes;

feed the normalized first blockchain data and the normalized second blockchain data to a clustering node, the clustering node comparing the first blockchain raw script hash bytes with the second blockchain raw script hash bytes, the comparing determining that the first blockchain raw script hash bytes are the same as the second blockchain raw script hash bytes;

determine the signed first cryptocurrency transaction and the signed second cryptocurrency transaction be controlled by a same individual or entity based on the first blockchain raw script hash bytes be the same as the second blockchain raw script hash bytes;

cluster the signed first cryptocurrency transaction and the signed second cryptocurrency transaction based on the determining the signed first cryptocurrency transaction and the signed second cryptocurrency transaction be controlled by the same individual or entity; and display an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction be controlled by the same individual or entity.

2. The system as recited in claim 1, wherein the one or more hardware processors are further configured by machine-readable instructions to: apply a multi-input heuristic node, the apply the multi-input heuristic node comprising feeding the normalized first blockchain data including the signed first cryptocurrency transaction and the normalized second blockchain data including the signed second cryptocurrency transaction to the multi-input heuristic node, the applying the multi-input heuristic node comprising the signed first cryptocurrency transaction and the signed second cryptocurrency transaction using the same private key; and link the signed first cryptocurrency transaction and the signed second cryptocurrency transaction to a known address based on the applying the multi-input heuristic node.

3. The system as recited in claim 1, wherein the one or more hardware processors are further configured by machine-readable instructions to: apply a lookback heuristic node, the apply the lookback heuristic node comprising feeding the normalized first blockchain data including the signed first cryptocurrency transaction and the normalized second blockchain data including the signed second cryptocurrency transaction to the lookback heuristic node, the applying the lookback heuristic node comprising pattern recognition in previous transactions from the signed first cryptocurrency transaction and signed second cryptocurrency transaction; and link the signed first cryptocurrency transaction and the signed second cryptocurrency transaction to a known address based on the applying the lookback heuristic node.

4. The system as recited in claim 1, applying a BitMex heuristic processing node, the applying the BitMex heuristic processing node comprising feeding the normalized first blockchain data including the signed first cryptocurrency transaction and the normalized second blockchain data including the signed second cryptocurrency transaction to the BitMex heuristic processing node, the applying the BitMex heuristic processing node comprising determining the signed first cryptocurrency transaction and the signed second cryptocurrency transaction use a vanity Bitcoin address, the vanity Bitcoin address comprising a prefix, the prefix comprising 3BMEX; and linking the signed first cryptocurrency transaction and the signed second cryptocurrency transaction to a known BitMex address based on the applying the BitMex heuristic processing node.

5. The system as recited in claim 1, wherein the one or more hardware processors are further configured by machine-readable instructions to: label the clustering the signed first cryptocurrency transaction and the signed second cryptocurrency transaction to a specific cryptocurrency.

6. The system as recited in claim 1, wherein the one or more hardware processors are further configured by machine-readable instructions to: assign the signed first cryptocurrency transaction a first integer for an integer-based index, and assigning the signed second cryptocurrency transaction a second integer for the integer-based index.

7. The system as recited in claim 6, wherein the first integer of the signed first cryptocurrency transaction, and the second integer for the signed second cryptocurrency transaction are the same integer, the same integer indicating the signed first cryptocurrency transaction and the signed second cryptocurrency transaction are controlled by the same individual or entity.

8. The system as recited in claim 1, wherein the first cryptocurrency chain and the second cryptocurrency chain are at least one of: Bitcoin (BTC) and Litecoin (LTC).

9. The system as recited in claim 1, wherein the one or more hardware processors are further configured by machine-readable instructions to: apply a connected components processing node, the connected components processing node generating sub-graphs related addresses.

10. The system as recited in claim 1, wherein the one or more hardware processors are further configured by machine-readable instructions to: update the clustering the signed first cryptocurrency transaction and the signed second cryptocurrency transaction based on additional blockchain data.

11. A process, comprising:
receiving first blockchain data for a first cryptocurrency chain from a first cryptocurrency chain participant node, the first blockchain data comprising a first cryptocurrency chain transaction block data including a signed first cryptocurrency transaction including a first human readable address hash and a first address key pair, the first address key pair including a private key and a public key, wherein the first cryptocurrency chain using an asymmetric encryption algorithm;
converting the first blockchain data for the first cryptocurrency chain to normalized first blockchain data normalized across different blockchains, the converting the first blockchain data for the first cryptocurrency chain to the normalized first blockchain data comprising decomposing the first human readable address hash to first blockchain raw script hash bytes;
receiving second blockchain data for a second cryptocurrency chain from a second cryptocurrency chain participant node, the second blockchain data comprising a second cryptocurrency chain transaction block data including a signed second cryptocurrency transaction including a second human readable address hash and a second address key pair, the second address key pair including the private key, wherein the second cryptocurrency chain using the asymmetric encryption algorithm, the asymmetric encryption algorithm being the same in the first cryptocurrency chain and the second cryptocurrency chain;
converting the second blockchain data for the second cryptocurrency chain to normalized second blockchain data normalized across different blockchains, the converting the second blockchain data for the second cryptocurrency chain to the normalized second blockchain data comprising decomposing the second human readable address hash to second blockchain raw script hash bytes;
feeding the normalized first blockchain data and the normalized second blockchain data to a clustering node, the clustering node comparing the first blockchain raw script hash bytes with the second blockchain raw script hash bytes, the comparing determining that the first blockchain raw script hash bytes are the same as the second blockchain raw script hash bytes;
determining the signed first cryptocurrency transaction and the signed second cryptocurrency transaction being controlled by a same individual or entity based on the first blockchain raw script hash bytes being the same as the second blockchain raw script hash bytes;
clustering the signed first cryptocurrency transaction and the signed second cryptocurrency transaction based on the determining the signed first cryptocurrency transaction and the signed second cryptocurrency transaction being controlled by the same individual or entity; and
displaying an interactive graphical user interface of a single cryptocurrency address mapping space, the single cryptocurrency address mapping space encompassing a plurality of cryptocurrencies including the clustering the signed first cryptocurrency transaction and the signed second cryptocurrency transaction indicating the signed first cryptocurrency transaction and the signed second cryptocurrency transaction being controlled by the same individual or entity.

12. The process as recited in claim 11, further comprising applying a multi-input heuristic node, the applying the multi-input heuristic node comprising feeding the normalized first blockchain data including the signed first cryptocurrency transaction and the normalized second blockchain data including the signed second cryptocurrency transaction to the multi-input heuristic node, the applying the multi-input heuristic node comprising the signed first cryptocurrency transaction and the signed second cryptocurrency transaction using the same private key; and linking the signed first cryptocurrency transaction and the signed second cryptocurrency transaction to a known address based on the applying the multi-input heuristic node.

13. The process as recited in claim 11, further comprising applying a lookback heuristic node, the applying the lookback heuristic node comprising feeding the normalized first blockchain data including the signed first cryptocurrency transaction and the normalized second blockchain data including the signed second cryptocurrency transaction to the lookback heuristic node, the applying the lookback heuristic node comprising pattern recognition in previous transactions from the signed first cryptocurrency transaction and signed second cryptocurrency transaction; and linking the signed first cryptocurrency transaction and the signed second cryptocurrency transaction to a known address based on the applying the lookback heuristic node.

14. The process as recited in claim 11, applying a BitMex heuristic processing node, the applying the BitMex heuristic processing node comprising feeding the normalized first blockchain data including the signed first cryptocurrency transaction and the normalized second blockchain data including the signed second cryptocurrency transaction to the BitMex heuristic processing node, the applying the BitMex heuristic processing node comprising determining the signed first cryptocurrency transaction and the signed second cryptocurrency transaction use a vanity Bitcoin address, the vanity Bitcoin address comprising a prefix, the prefix comprising 3BMEX; and
linking the signed first cryptocurrency transaction and the signed second cryptocurrency transaction to a known BitMex address based on the applying the BitMex heuristic processing node.

15. The process as recited in claim 11, further comprising labeling the clustering the signed first cryptocurrency transaction and the signed second cryptocurrency transaction to a specific cryptocurrency.

16. The process as recited in claim 11, further comprising assigning the signed first cryptocurrency transaction a first integer for an integer-based index, and assigning the signed second cryptocurrency transaction a second integer for the integer-based index.

17. The process as recited in claim 16, wherein the first integer of the signed first cryptocurrency transaction, and the second integer for the signed second cryptocurrency transaction are the same integer, the same integer indicating the signed first cryptocurrency transaction and the signed second cryptocurrency transaction are controlled by the same individual or entity.

18. The process as recited in claim 11, wherein the first cryptocurrency chain and the second cryptocurrency chain are at least one of: Bitcoin (BTC) and Litecoin (LTC).

19. The process as recited in claim 11, further comprising applying a connected components processing node, the connected components processing node generating subgraphs related addresses.

20. The process as recited in claim 11, further comprising updating the clustering the signed first cryptocurrency transaction and the signed second cryptocurrency transaction based on additional blockchain data.

* * * * *